United States Patent [19]

Manico et al.

[11] Patent Number: 5,244,528
[45] Date of Patent: Sep. 14, 1993

[54] PHOTOGRAPHIC NEGATIVE STORAGE APPARATUS WITH ILLUMINATED VACUUM WORK HOLDER

[75] Inventors: Joseph A. Manico; Katherine M. Smelker; Bruce E. Hartz; John-M. Kowalski, all of Rochester, N.Y.; Charles L. Baldwin, Jr., Penfield, N.Y.

[73] Assignee: Eastman Kodak Company, Rochester, N.Y.

[21] Appl. No.: 817,242

[22] Filed: Jan. 6, 1992

[51] Int. Cl.$^5$ .................................... B32B 31/00
[52] U.S. Cl. ............................ 156/358; 156/359; 156/366; 156/379; 156/379.6; 156/380.2; 156/380.6; 156/559; 156/583.2; 156/583.9
[58] Field of Search ............... 156/379, 383, 583.2, 156/583.7, 583.9, 349, 580, 358-359, 366, 380.8, 379.8, 285, 379.6, 380.2, 380.6, 559; 248/683

[56] References Cited

U.S. PATENT DOCUMENTS

| | | | |
|---|---|---|---|
| 2,348,237 | 5/1944 | Barr et al. | 156/379 X |
| 2,493,159 | 1/1950 | Morrison | 156/379 |
| 3,005,483 | 10/1961 | Middents et al. | 156/583.9 |
| 3,893,881 | 7/1975 | Gerber et al. | 156/285 X |
| 3,956,054 | 5/1976 | Griswold et al. | 156/379 |
| 4,398,982 | 8/1983 | Witerski et al. | 156/502 X |
| 4,705,587 | 11/1987 | Smith | 156/583.2 X |
| 4,818,313 | 4/1989 | Sundberg | 156/366 X |
| 5,031,773 | 7/1991 | Manico et al. | 206/455 |

Primary Examiner—David A. Simmons
Assistant Examiner—Chester T. Barry
Attorney, Agent, or Firm—Ronald M. Reichman

[57] ABSTRACT

A method and apparatus that uses heat to bond a polyethylene sleeve (having pockets that contain negative strips) to the back non-light sensitive surface of a photographic paper coated with polyethylene. A positive image or index print of the information stored on the negative appears on the front light sensitive, image bearing surface of the photographic paper.

7 Claims, 6 Drawing Sheets

PHOTOGRAPHIC NEGATIVE STORAGE APPARATUS WITH ILLUMINATED VACUUM WORK HOLDER

BACKGROUND OF THE INVENTION

1. Field Of The Invention

This invention relates generally to the field of photofinishing and particularly to a system and method for storing photographic negatives on the back surface of a photographic index print.

2. Description Of The Prior Art

Most photographs are produced by: exposing a film to light; developing the film to produce a negative; and processing (printing) the negative to produce a photographic print. The dark areas in the negative allow little light to pass so that the tones in the print appear light as they did in the original scene. Also the negatives from most color films have an overall orange color, and are smaller than the print. Thus, even when the negatives and prints for one or more processed rolls of film are together, it is difficult for an amateur photographer who is not trained to view photographic negatives to determine the negative that was used to produce a specific print.

An amateur photographer may receive the negatives and prints for one or more rolls of processed film in an envelope having two compartments. The negatives are usually placed in one compartment and the prints are usually placed in the other compartment. Some of the prints may be: given away; placed in a photo album; framed; or become separated from the negatives. The envelopes maybe haphazardly thrown in a box and mixed with other envelopes in the box. Thus, when someone wants to order reprints or enlargements of one or more prints it may be difficult to locate the negatives that correspond to the prints that they want to order.

When the prints and negatives are packaged together in an envelope, the negatives are susceptible to scratching and contamination from dust, dirt and/or fingerprints because the envelope does not provide a damage-free environment for the negatives. The various forms of negative damage mentioned above will reduce the quality of the reprints and enlargements that are made from the negatives.

Sometimes an amateur photographer places the negatives in wax or plastic sleeves to protect and store the negatives and accidentally damages the negatives as they are inserted into the sleeves. Furthermore, the above procedure is time consuming.

Manico et al. U.S. Pat. No. 5,031,773 entitled "Photographic Image Set", which was assigned to Eastman Kodak Company, discloses a photographic image set that includes an index print which is integrally stored with the associated negative strips to provide a convenient single storage and retrieval system. A translucent layer of glue, double stick tape, or any conventional adhesive is used for laminating a sleeve or holder for the negatives to the index print. While the disclosed holder for storing a photographic image set has proved to be highly satisfactory, the tape or adhesive increases the cost of the sleeving material and conventional cutting and sleeving equipment cannot be used with the adhesive backed sleeves without significant modifications. In addition, after use, the clear plastic adhesive cover sheet must be disposed.

SUMMARY OF THE INVENTION

The present invention overcomes the disadvantages of the prior art by providing a method and system that uses heat to bond a polyethylene sleeve that contains negatives to the back surface of a photographic paper coated with polyethylene. An index print of the information stored on the negatives contained within the polyethylene sleeve appears on the front surface of the photographic paper.

The foregoing is achieved by:
  inserting one or more negative strips in a pocket of a polyethylene sleeving material;
  producing a positive image of each of the negatives appearing on the negative strip on the image bearing side of a two-sided polyethylene coated photographic paper;
  placing the sleeve material on the non-light sensitive side of the photographic paper;
  heating portions of the sleeving material where no negatives are present so that the sleeving material will bond with the polyethylene coated paper and the one or more negative strips, the sleeving material, and positive image will form a negative storage device.

DESCRIPTION OF THE DRAWINGS

FIG. 3 and 3A are perspective representation of the apparatus of this invention;

DESCRIPTION OF THE PREFERRED EMBODIMENT

Figure 1:
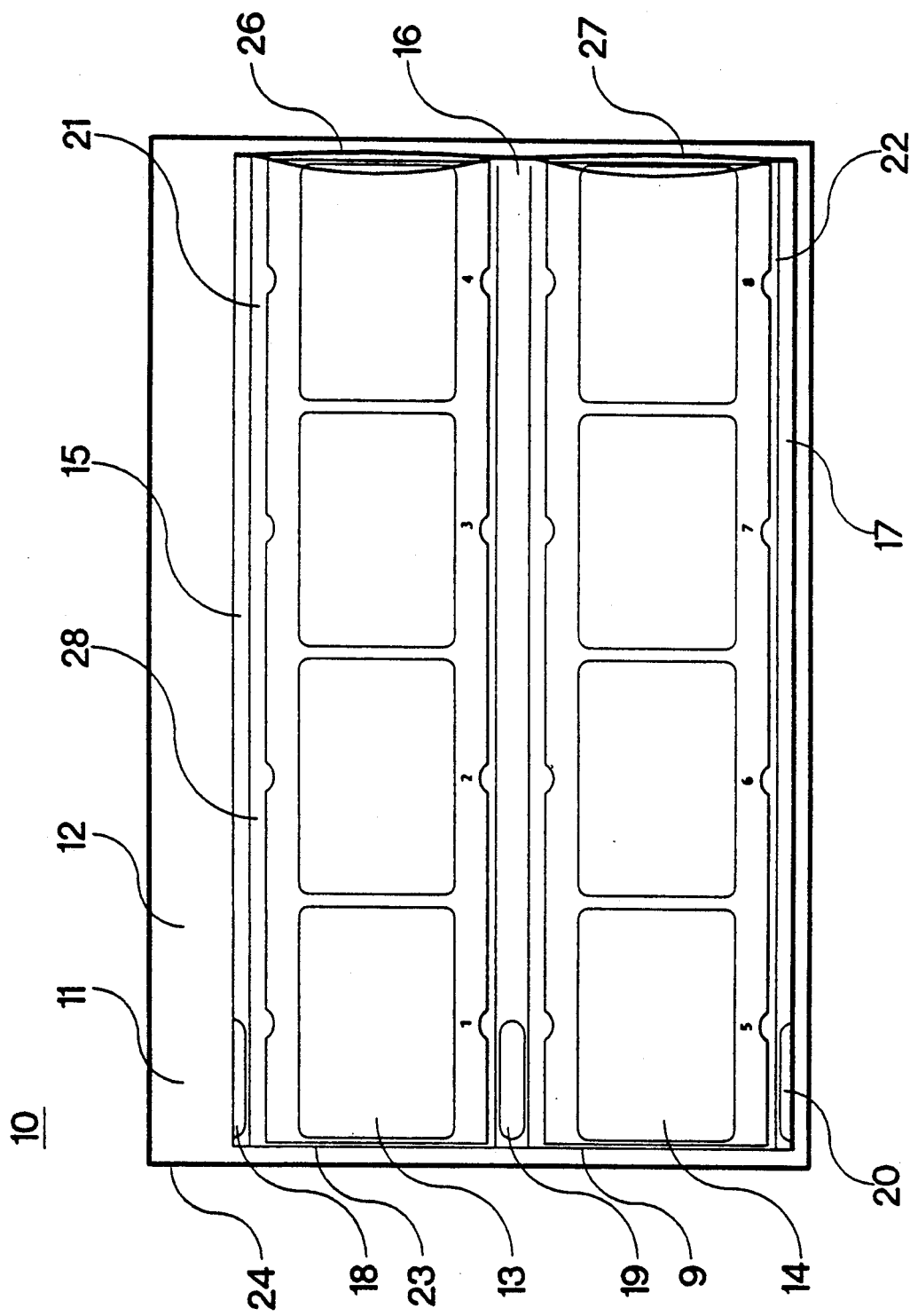
FIG. 1 is a perspective diagram showing negative strips in negative sleeving material which is affixed to the back surface of a piece of photographic paper.

Referring now to the drawings in detail and more particularly to FIG. 1, the reference character 10 represents a piece of conventional color photographic paper, such as Ektacolor Edge. Ektacolor Edge is manufactured by Eastman Kodak Company and during the manufacturing of Ektacolor Edge, the back side of paper 10 that is surface 11 was coated with a clear layer of polyethylene 12. Negative strip 13 contains frames 1-4 of a conventional 35 mm filmstrip and negative strip 14 contains frames 5-8 of a conventional 35 mm filmstrip. Negative strips 13 and 14 are placed in pockets 22 and 28 of negative sleeving material 9 via openings 26 and 27. Wall 23 prevents negative strips 13 and 14 from being removed from one end of pockets 22 and 28. Sleeving 9 may be any clear, heat bondable material i.e. polyethylene. Negative sleeving material 9 and negative strips 13 and 14 are placed over layer 12 in such a manner that sleeve pocket 21 and 22 seams 15, 16 and 17 whose location may respectively be easily determined on the clear negative sleeving material 9 by indicators 18, 19 and 20 will not be over or in close proximity to the area taken by positive image or index prints 30. Index prints 30 appear on surface 24 of photographic paper 10 and will be more fully described in the description of FIG. 2.

Seams 15, 16 and 17 are affixed to surface 11 by applying heat having a temperature between 280° F. and 320° F. for approximately one to three seconds to seams 15, 16 and 17. The heat will cause seams 15, 16 and 17 to bond to polyethylene layer 12 of surface 11 without damaging negative strips 13 and 14 and index prints 30. Negative strips 13 and 14 will be contained within pockets 21 and 22 of sleeving 9 and sleeving 9 will be affixed to layer 12 of paper 10 so that negative strips 13 and 14, sleeving 9, and index prints 30 will form a carrier and negative storage device which is capable of being moved from one location to another.

Figure 2:
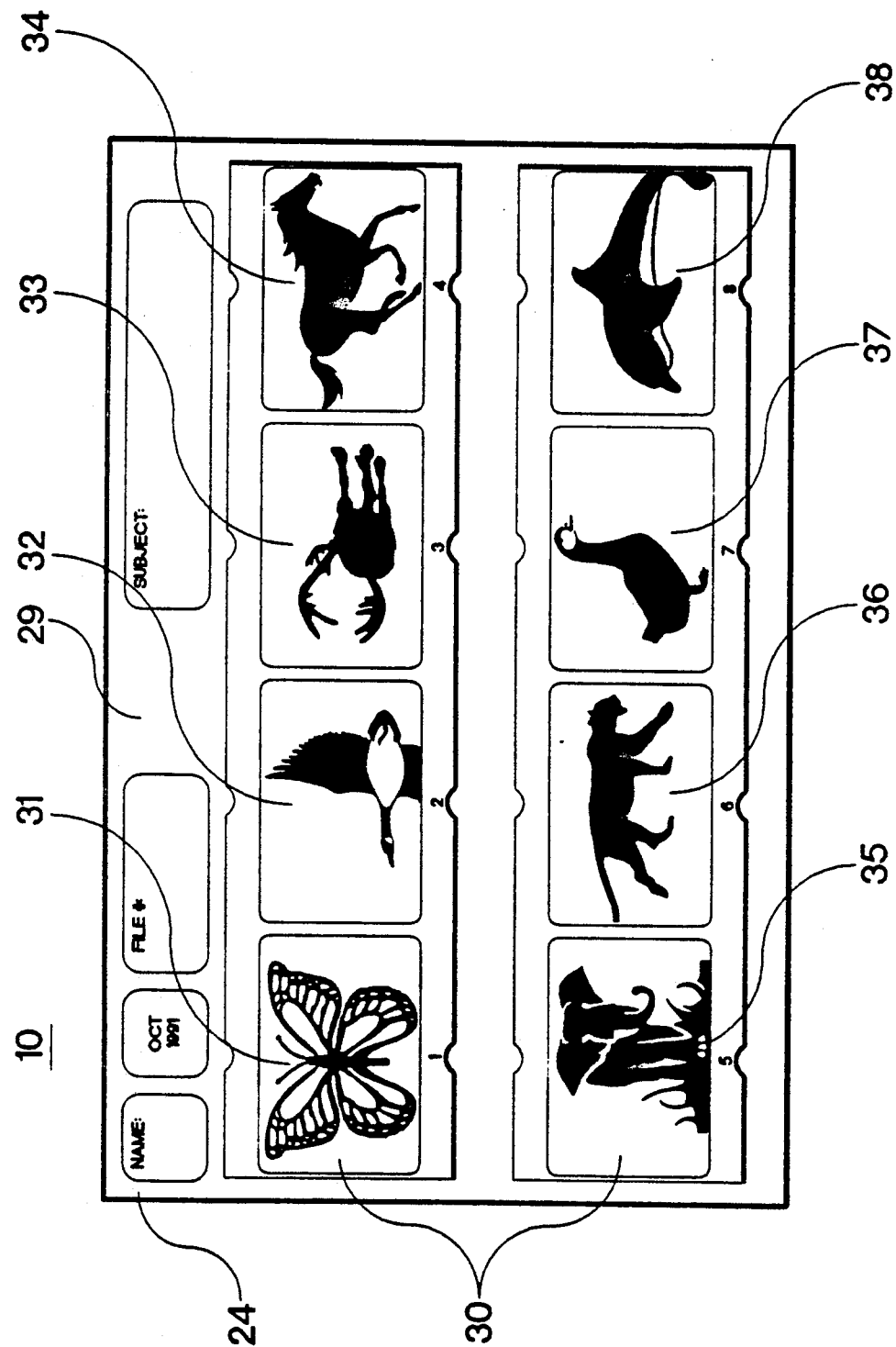
FIG. 2 is a front view of an index print on the front surface of the photographic paper depicted in FIG. 2.

FIG. 2 is a front view of surface 24 of photographic paper 10. Various amateur photographer specific information that represents subject, title, date, photographer name, file no., etc., may be printed by the photofinisher in space 29 and/or the photographer may write all or part of the above information in space 29. A plurality of images 31-38 that comprises index print 30 are printed on surface 24. Images 31-34 respectively are positives of frames 1-4 of negative strip 13 (shown in FIG. 1) and images 35-38 are positives of frames 5-8 of negative strip 14 (shown in FIG. 1). Index print 30 is printed in a manner that it will be easy to ascertain that images 31-34 are positives of frames 1-4 of negative strip 13 and images 35-38 are positives of frames 5-8 of negative strip 14. Index prints 30 and negative strips 13 and 14 may be stored together as a single unit. Thus, if an amateur photographer wanted reprints or enlargements of one or more of images 35-38, the amateur photographer would have to locate paper 10.

From index print 30, the amateur photographer would note the frame number of images 31-38 that he wanted reprinted or enlarged. Thereupon, the amateur photographer would be able to transmit paper 10 to a photofinisher and request specific reprints and/or enlargements without viewing any negatives.

Figure 3:
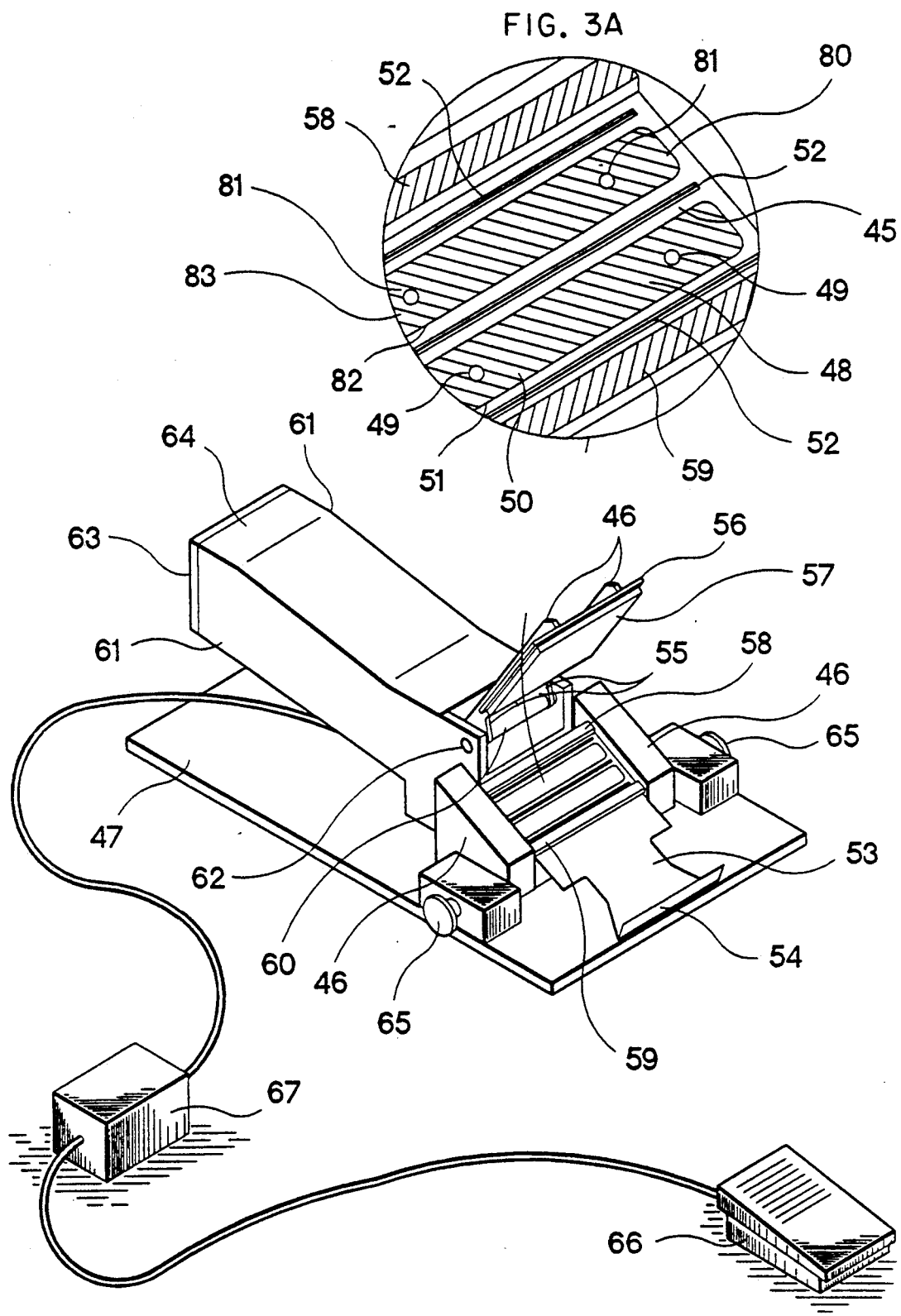

FIG. 3 is a perspective representation of the apparatus of this invention. Nest 45 is connected to side covers 46 and mounting plate 47 by any conventional fastening means ie. bolts, screws, rivets, (not shown) etc.. Nest 45 comprises: translucent stripping actuator 48, which has orifices 49 running from top surface 50 of actuator 48 to bottom surface 51 of actuator 48; actuator 80 which has orifices 81 running from top surface 82 to bottom surface 83 of actuator 80; upper stop 58; lower stop 59; and silicone adhesive bonded polytetrafluoroethylene coated fiberglass tape (PTFE) 52 which is used to insulate nichrome ribbon 70 (which is described in the description of FIG. 4). Negative chute 53 has a lip 54 at one of its ends and a flat surface at its other end. The flat surface of chute 53 is connected to nest 45 by any conventional fastening means (not shown). Hinge arms 55 are connected to clamp 56 by conventional fastening means and silicone foam pad 57 are connected to clamp 56 by conventional fastening means. Pin 60 is connected to hinge arms 55, side plates 61 and bearings 62 so that pad 57 may rotate about pin 60. Back plate 63 and cover 64 are connected to plates 61 by any conventional fastening means. Start actuator assembly buttons 65 are connected to mounting plate 47 by any conventional fastening means. Foot switch 66 is coupled to control unit 67 and control unit 67 is coupled to the apparatus of this invention. Control unit 67 will be more fully described in the description of FIG. 6.

In the operation of the apparatus of this invention the negative strips 13 and 14 which were placed in pockets 22 and 28 of negative sleeving material 9 (described in the description of FIG. 1) are positioned by the operator of this invention on nest 45 against upper stop 58 and secured in the aforementioned location by the operator's actuation of foot switch 66. The actuation of foot switch 66 causes a vacuum to appear in orifices 49 and 81 which causes sleeving material 9 to be held against upper stop 58. The operation of foot switch 66 will be more fully described in the description of FIG. 6.

Illumination means 90 ie. light bulbs etc. (described in the description of FIG. 6) is positioned below actuator 48 and actuator 80 to illuminate negative strips 13 and 14 so that the operator may determine the information contained in the frames of negative strips 13 and 14. The operator will now compare the images appearing on index print 30 (FIG. 2) to the information contained in the frames of negative strips 13 and 14 and check the alignment of the negative. If index print 30 is a positive of the information contained in the frames of negative strips 13 and 14 index print 30 is positioned by the operator over upper stop 58 and against lower stop 59. Surface 11 of paper 10 will be facing negative strips 13 and 14 and surface 24 of paper 10 ie. the side having index prints 30 will face the operator. If index print 30 is not a positive of the information contained in the frames of negative strips 13 and 14 index print 30 will not be positioned over upper stop 58 and against lower stop 59. The operator will try and find the correct print 30.

Once the correct index print 30 is positioned over stop 58 and against lower stop 59, the operator depresses start actuator assembly buttons 65. Thereupon, upper clamp 56 rotates about pin 60 until it hits upper stop 58. Clamp 56 causes stop 58 to retract into nest 45. After stop 58 retracts into nest 45, clamp 56 continues to move towards nest 45 until pad 57 of clamp 56 presses index print 30 into negative sleeve 9. At this time control unit 67 will transmit approximately a 20 amp current (having a duration of approximately one to three seconds) to nichrome ribbon 70. At this point the operator may release buttons 65. The aforementioned current will cause nichrome ribbon 70 to have a temperature between 280° F. and 320° F. which will cause polyethylene sleeving 9 to melt into layer 12 of paper 10. After the above current is removed from ribbon 70, pad 57 will remain in contact with index print 30 for approximately two to four seconds so that the melted portions of sleeving 9 and the melted portions of polyethylene layer 12 will reform into seams 15, 16 and 17 (described in the description of FIG. 1).

After seams 15, 16 and 17 have formed: upper clamp 56 rotates to an open position about pin 60; the vacuum in orifices 49 and 81 is removed; actuator 48 and actuator 80 pushes sleeving 9 away from tape 52; and paper 10 will fall into chute 53 against chute lip 54. Index prints 30 will be on surface 24 of photographic paper 10 and negative sleeving material 9 (containing respectively negative strips 13 and 14 in pockets 22 and 28) will be bonded to layer 12 of paper 10.

Figure 4:
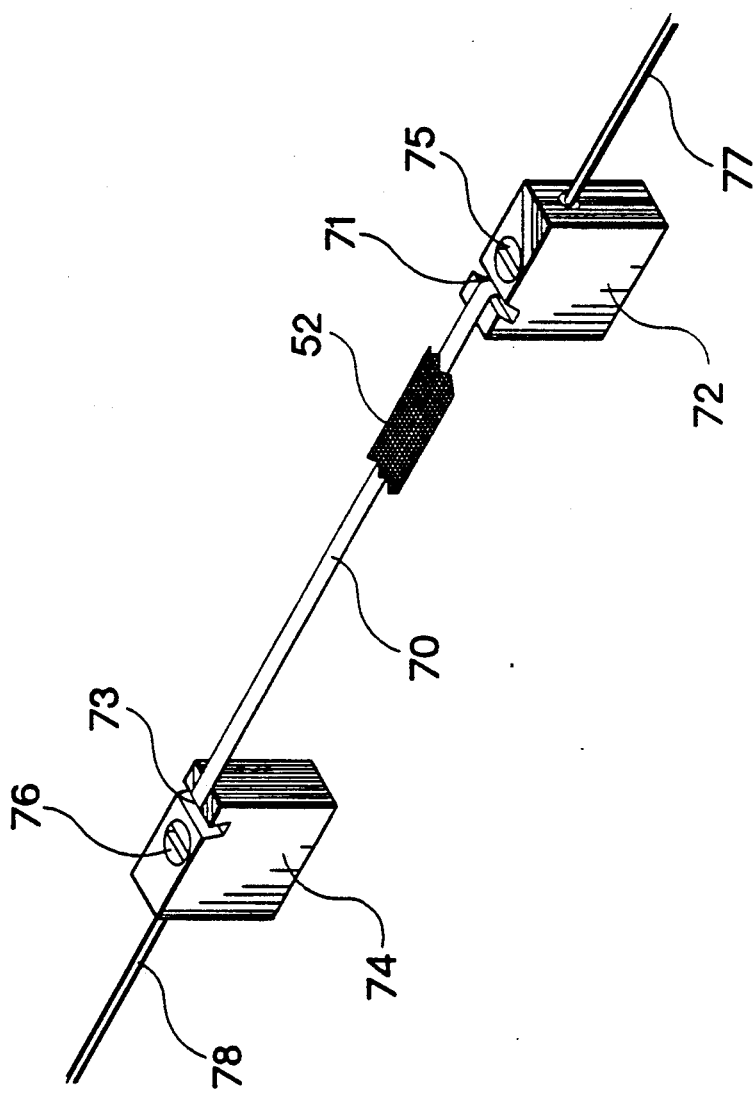
FIG. 4 is a perspective representation of PTFE tape 52 and one of the three nichrome ribbons 70.

FIG. 4 is a perspective representation of one of the three nichrome ribbons 70 showing the removal of a portion of PTFE tape 52 from ribbon 70. One end of ribbon 70 is placed in wedge 71 of conductive block 72 and the other end of ribbon 70 is placed in wedge 73 of conductive block 74. The tightening of nuts 75 and 76 respectively couple ribbon 70 to blocks 72 and 74. Wire 77 is connected to block 72 and wire 78 is connected to block 74. Blocks 72 and 74 rest on plate 47 and are covered by side covers 46 in FIG. 1).

Figure 5:
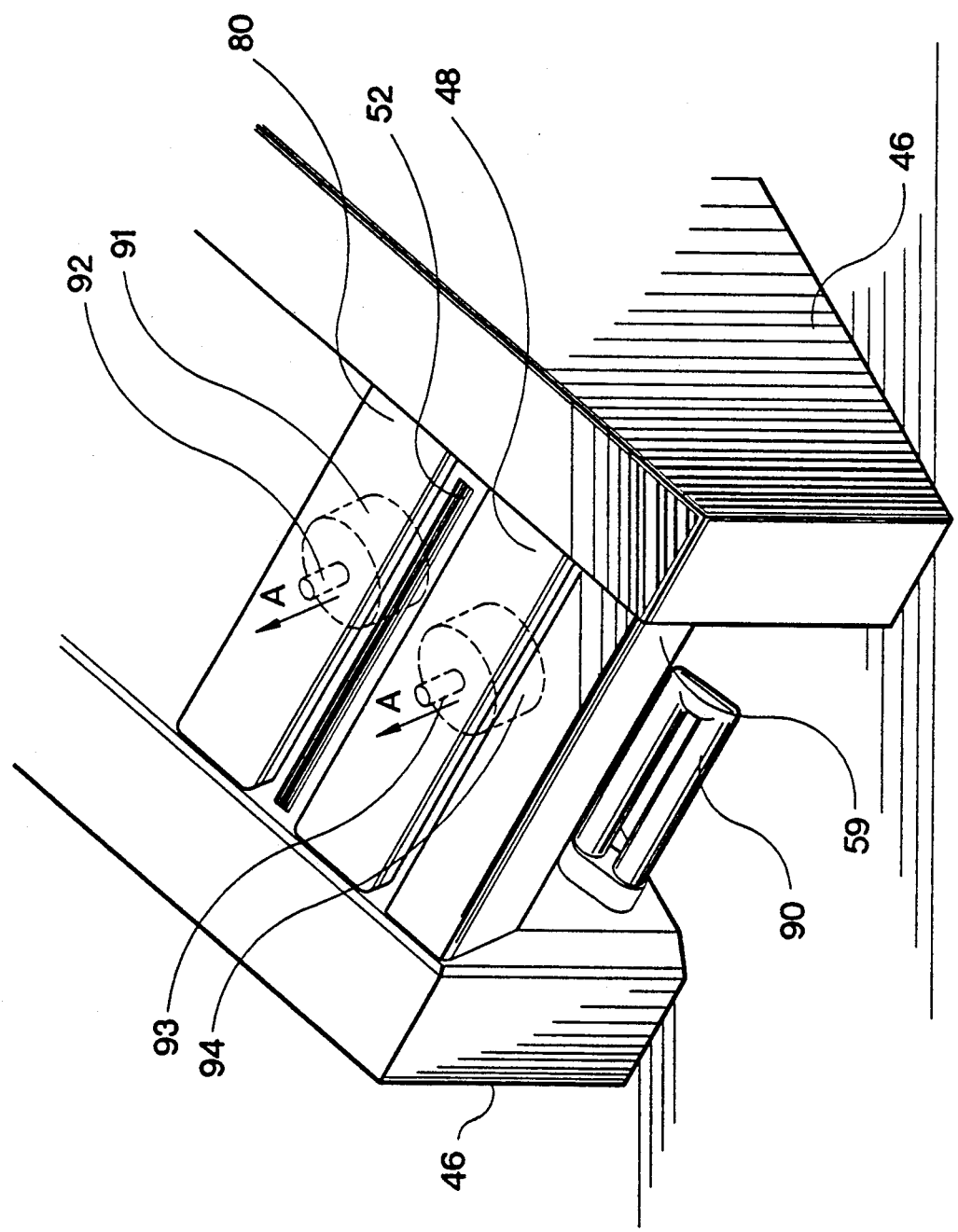
FIG. 5 is a perspective representation of a portion of the apparatus of this invention showing lamp 90, actuator 48 and actuator 80.

FIG. 5 illustrates actuators 48 and 80 in a open position, PTFE tape 52, lower stop 59, covers 46 and illuminating means 90 (negative chute 53 has been removed). Shaft 92 connects air cylinder 91 to actuator 80 and shaft 93 connects actuator 48 to air cylinder 94. When an approximately 60 psi air stream is transmitted to air cylinders 91 and 94 shafts 92 and 93 will move in the direction indicated by arrow A. Shafts 92 and 93 will respectively move actuators 80 and 48 in the direction indicated by arrow A (from the closed position illustrated in FIG. 3 to the open position illustrated in FIG. 6). The aforementioned movement of actuators 80 and 48 will separate negative sleeving 9 (shown in FIG. 1) from PTFE tape 52 and cause sleeving 9 (containing respectively negative strips 13 and 14 in pockets 22 and 28) which is bonded to paper 10 and index print 30 (which is on surface 24 of paper 10) to fall into chute 53 (shown in FIG. 3).

Actuators 48 and 80 are made of a translucent material. Illuminating means 90 illuminates the negative strips 13 and 14 which are contained in sleeving 9 (shown in FIG. 1). Thus, when actuators 48 and 80 are in a closed position and before an index print 30 is placed over negative sleeving 9, the operator may view the negative strips contained in sleeving 9 and compare them with index print 30.

Figure 6:
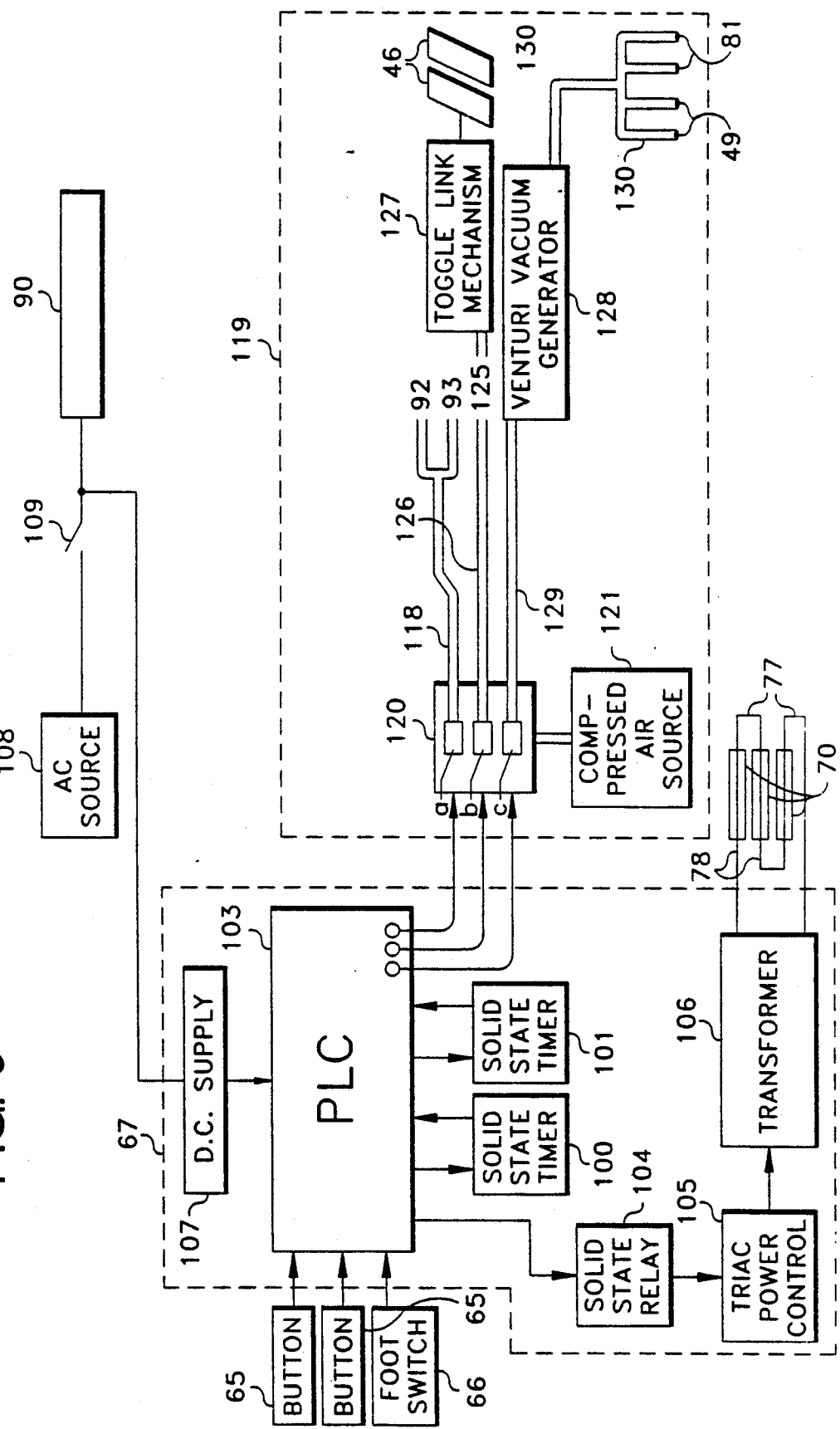
FIG. 6 is a diagram of the pneumatic system and control unit 67 of the apparatus of this invention.

FIG. 6 is a diagram of control unit 67 and pneumatic system 119 of the apparatus of this invention. Control unit 67 comprises: programmable logic control (PLC) 103 (PLC 103 is the SLC 150 integrated circuit manufactured by the Allen Bradley Company of Rockwell International); solid state relay 104; triac power control 105; transformer 106; manually adjustable solid state timers 100 and 101; and D.C. power supply 107. One terminal of main power switch 109 is coupled to A.C. power source 108 and the other terminal of switch 109 is connected to illuminating means 90 and D.C. power supply 107. Start buttons 65, foot switch 66 and D.C. power supply 107 are coupled to the inputs of PLC 103. One of the outputs of PLC 103 is connected to the input of solid state timer 100 and the output of timer 100 is coupled to one of the inputs of PLC 103. One of the outputs of PLC 103 is connected to the input of solid state timer 101 and the output of timer 101 is coupled to one of the inputs of PLC 103. One of the outputs of PLC 103 is connected to the input of solid state relay 104 and the output of relay 104 is coupled to the input of triac power control 105. The output of triac 105 is connected to the input of transformer 106. The output of transformer 106 is connected to wire 78 of the first ribbon 70 and wire 77 of the first ribbon 70 is connected to wire 77 of the second ribbon 70. Wire 78 of the second ribbon 70 is connected to wire 78 of the third ribbon 70 and wire 77 of the third ribbon 70 is connected to transformer 106.

After the operator places index print 30 over negative sleeving 9 the operator simultaneously depresses start buttons 65. The closing of buttons 65 transmits a new cycle signal to PLC 103. Thereupon, PLC 103: transmits a signal to timer 100 requesting that timer 100 begin its timing cycle; transmits a signal to relay 104; and transmits a signal to pneumatic system 119 requesting that pneumatic system close clamp 56. Relay 104 transmits a signal to triac 105 and triac 105 transmits a current to transformer 106. Transformer 106 adjusts its voltage to supply the correct output current to nichrome ribbons 70 so that ribbons 70 will be at the correct temperature. After timer 100 finishes timing, timer 100 transmits a completed timing signal to PLC 103. Then, PLC 103 transmits a signal to timer 101 requesting that timer 101 begin its timing cycle PLC 103 also turns off relay 104 so that no current will be supplied to nichrome ribbons 70. Thus, ribbons 70 will not generate any additional heat.

After timer 101 finishes timing, timer 101 transmits a completed timing signal to PLC 103. Then, PLC 103 informs pneumatic system 119 that clamp 56 may be opened, since the melted portions of sleeving 9 and the melted portions of layer 12 had enough time to cool and reform into seams 15, 16 and 17.

Pneumatic system 119 comprises: Pneumatic valves 120; compressed air source 121; tubes 118, 126, 129, and 130; shafts 92 and 93; air cylinder 125; orifices 49 and 81; and venturi vacuum generator 128. Source 121 supplies compressed air to valves 120. Valves 120 include valves a, b, and c. Wire 110 electrically couples valve a with PLC 103 and wire 111 electrically couples valve b with PLC 103. Wire 112 electrically couples valve c with PLC 103. Tube 118 connects valve a to shafts 92 and 93 and tube 126 connects air cylinder 125 to valve b. Cylinder 125 is coupled to toggle link mechanism 127 and toggle link mechanism 127 is coupled to hinge arms 46.

After the operator of the apparatus of this invention positions negative sleeving material 9 against upper stop 58 the operator depresses foot switch 66. The closing of switch 66 transmits a signal to PLC 103. Then, PLC 103 transmits a open valve signal to valve c via wire 112. The opening of valve c causes compressed air from air source 121 to be transmitted to venturi vacuum generator 128 via tube 129. Generator 128 establishes a vacuum in tubes 130 and in orifices 49 and 81. The aforementioned vacuum causes sleeving material 9 to be held against upper stop 58 (FIG. 3).

Once PLC 103 receives its new cycle signal, PLC 103 transmits a open valve signal to valve b via wire 111. The opening of valve b causes compressed air from air source 121 to be transmitted to air cylinder 125 via tube 126. Cylinder 126 activates toggle link mechanism 127 and toggle link mechanism 127 causes hinge arm 46 to rotate about pin 60 and bearings 62 closing clamp 56.

After PLC 103 receives the completed timing signal from timer 101, PLC 103 transmits a close valve signal to valve b via wire 111. The closing of valve b prevents the transmission of compressed air from source 121 to cylinder 125, which causes clamp 56 to open. At this juncture PLC 103 transmits a open valve signal to valve a via wire 110. The opening of valve a causes compressed air from air source 121 to be transmitted to shafts 92 and 93 via tube 118. Shafts 92 and 93 will respectively move actuators 80 and 48 (FIG. 5) to an open position causing negative sleeving material 9 to separate from PTFE tape 52. Tube 129 connects valve c to venturi vacuum generator 128 and tubes 130 connect generator 128 to orifices 130.

The above specification describes a new and improved photographic negative storage device. It is realized that the above description may indicate to those skilled in the art additional ways in which the principles of this invention may be used without departing from the spirit. It is, therefore, intended that this invention be limited only by the scope of the appended claims.

What is claimed is:

1. An apparatus for bonding a polyethylene sleeving material, having pockets that contain one or more negative strips, to a polyethylene coated side of a two sided photographic paper, which has an index print of the negative strips on the opposite side of the photographic paper, said system comprising:

a housing;

at least one translucent actuator connected to said housing for holding and supporting the sleeving against the polyethylene coated side of the photographic paper;

means coupled to said actuator for illuminating said actuator that illuminates the negatives contained in the sleeving so that an operator may view the negatives and determine that the index print is properly aligned and is a print of the negative, wherein said actuator has at least one orifice running there through;

means coupled to said actuator for placing the polyethylene side of the photographic paper in contact with the sleeving materials;

means coupled to the orifice of said actuator for establishing and removing a vacuum at the top surface of said actuator to respectively hold the sleeving against the top surface of said actuator and to release the bonded sleeving and photographic paper from the top surface of said actuator;

a source of electrical resistance that emits heat when a current passes through said source to heat portions of the sleeving material where no negatives are present so that the sleeving material will bond with the polyethylene coated surface;

means for moving said actuator from a position in which the sleeving is in contact with said source to a position in which the sleeving is not in contact with said source, whereby the one or more negative strips, the sleeving material and the index print will form a negative storage device which is capable of being moved from one location to another.

2. The apparatus claimed in claim 1, wherein said means for moving comprises:

a controllable gas source;

a cylinder that is coupled to said gas source and said actuator so that when said cylinder receives gas said cylinder will move said actuator.

3. The apparatus claimed in claim 1, wherein said source is a nichrome ribbon.

4. The apparatus claimed in claim 1, wherein said source is a nichrome ribbon that is covered by a PTFE insulator.

5. The apparatus claimed in claim 1, further including means for controlling the heat produced by said heating means and the times that said moving means will move said actuator.

6. The apparatus claimed in claim 5, wherein said controlling means comprises:

a first manually adjustable timer for determining the time that the sleeving will receive heat from said heating means;

a second manually adjustable timer for determining the time that said moving means will move said actuator; and a programmable logic control that is coupled to said first and second timers, said heating means and said moving means, said programmable control controls the movement of said moving means and the amount of heat produced by said heating means.

7. The apparatus claimed in claim 1, further including: means for pressing the polyethylene surface of the photographic paper against the sleeving.

* * * * *